United States Patent
Husar et al.

(10) Patent No.: US 10,021,528 B2
(45) Date of Patent: Jul. 10, 2018

(54) PROVIDING SPECIFICATION OF A LOCATION OF A COMMUNICATION DEVICE

(71) Applicant: Red Hat, Inc., Raleigh, NC (US)

(72) Inventors: Radoslav Husar, Brno (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 639 days.

(21) Appl. No.: 13/685,518

(22) Filed: Nov. 26, 2012

(65) Prior Publication Data

US 2014/0149482 A1    May 29, 2014

(51) Int. Cl.
G06F 15/16    (2006.01)
H04W 4/029    (2018.01)
H04W 4/02    (2018.01)
H04L 29/08    (2006.01)

(52) U.S. Cl.
CPC ............. *H04W 4/029* (2018.02); *H04L 67/18* (2013.01); *H04W 4/027* (2013.01); *H04W 4/028* (2013.01)

(58) Field of Classification Search
CPC ...... G06Q 30/02; G06Q 20/20; G06Q 20/204; G06Q 50/10; G06Q 30/0261; G06Q 30/0239; G06Q 30/0242; G06Q 30/0251; G06Q 30/0256; G06Q 30/0269; G06Q 20/382; G06Q 30/0222; G06Q 30/0264; G06Q 30/06; G06Q 30/0267; G06Q 30/0255; G06Q 10/06; G01S 5/0205; G01S 5/0284; H04M 1/72572; H04W 4/021; H04W 4/025; H04W 88/02; H04W 64/00; H04W 4/028; H04W 4/027; G06F 2221/2111; G06F 2221/2117; H04L 67/18

USPC ...... 709/201–202, 207, 223, 224; 705/14.58, 705/14.64, 14.53, 14.39, 14.4, 14.41, 705/14.49, 14.66, 14.73, 14.23, 14.27, 705/14.36, 14.54, 14.55, 14.61, 1.1, 26.1, 705/64; 340/539.13, 8.1, 988; 455/456.1, 414.2, 456.3, 457, 404.2

See application file for complete search history.

(56) References Cited

U.S. PATENT DOCUMENTS 6,542,822 B1 *    4/2003    Froeberg .................. 701/468
7,043,255 B1 *    5/2006    Tiwari ................... H04W 8/18
                                                    455/456.1

(Continued)

*Primary Examiner* — Anthony Mejia
(74) *Attorney, Agent, or Firm* — Lowenstein Sandler LLP

(57) ABSTRACT

A mechanism for providing specification of a location of a user of a communication device. A method includes receiving, by a processing device a first position data of a communication device. The first position data is a location of the user of the communication device at a first time when the user begins to at least either compose a message on the communication device or initiate an application to compose the message. The method also includes receiving, by the processing device, a second position data of the communication device. The second position data is the location of the user at a second time when the user sends the message to a recipient via the communication device. The method also includes generating, by the processing device, a velocity vector based on the first position data, the second position data, the first time data and the second time data. The method further includes sending, by the processing device, the velocity vector with the message to the recipient.

20 Claims, 5 Drawing Sheets

(56) References Cited

U.S. PATENT DOCUMENTS

| | | | | | |
|---|---|---|---|---|---|
| 7,370,079 | B2* | 5/2008 | Murata | | G01C 21/362 |
| | | | | | 701/532 |
| 7,418,495 | B2* | 8/2008 | Glasser et al. | | G06F 15/16 |
| | | | | | 709/224 |
| 8,849,694 | B1* | 9/2014 | Chatterjee | | G06Q 30/0261 |
| | | | | | 705/14.1 |
| 8,886,212 | B2* | 11/2014 | Habicher | | 455/456.1 |
| 9,942,919 | B2* | 5/2015 | Trussel et al. | | H04W 24/00 |
| | | | | | 455/457 |
| 2002/0091568 | A1* | 7/2002 | Kraft et al. | | 705/14 |
| 2004/0076279 | A1* | 4/2004 | Taschereau | | 379/218.01 |
| 2006/0206586 | A1* | 9/2006 | Ling et al. | | 709/219 |
| 2006/0229058 | A1* | 10/2006 | Rosenberg | | 455/404.2 |
| 2006/0284764 | A1* | 12/2006 | Chintyan | | G01S 5/0027 |
| | | | | | 342/357.31 |
| 2007/0155406 | A1* | 7/2007 | Dowling et al. | | 455/456.1 |
| 2008/0102889 | A1* | 5/2008 | May et al. | | H04M 1/00 |
| | | | | | 455/556.2 |
| 2008/0268870 | A1* | 10/2008 | Houri | | G01S 5/0252 |
| | | | | | 455/456.1 |
| 2009/0165089 | A1* | 6/2009 | Bennett | | G06F 21/41 |
| | | | | | 726/3 |
| 2009/0176509 | A1* | 7/2009 | Davis et al. | | 455/456.3 |
| 2009/0318163 | A1* | 12/2009 | George | | H04B 7/00 |
| 2010/0097208 | A1* | 4/2010 | Rosing | | G06Q 10/087 |
| | | | | | 340/539.13 |
| 2010/0121716 | A1* | 5/2010 | Golan | | 705/14.58 |
| 2010/0291948 | A1* | 11/2010 | Wu | | G01S 5/0072 |
| | | | | | 455/456.1 |
| 2010/0293239 | A1* | 11/2010 | Cross | | H04L 12/581 |
| | | | | | 709/206 |
| 2011/0238755 | A1* | 9/2011 | Khan | | H04W 4/21 |
| | | | | | 709/204 |
| 2013/0031183 | A1* | 1/2013 | Gowdra et al. | | G06F 15/16 |
| | | | | | 709/206 |
| 2013/0045759 | A1* | 2/2013 | Smith | | H04W 4/029 |
| | | | | | 455/456.6 |
| 2013/0054750 | A1* | 2/2013 | Rossmann | | 709/219 |
| 2013/0331131 | A1* | 12/2013 | Fix et al. | | 455/457 |
| 2015/0080016 | A1* | 3/2015 | Smith | | H04L 65/1006 |
| | | | | | 455/456.1 |

* cited by examiner

PROVIDING SPECIFICATION OF A LOCATION OF A COMMUNICATION DEVICE

TECHNICAL FIELD

The embodiments of the disclosure relate generally to a computer system and, more specifically, relate to mechanism for providing specification of a location of a user of a communication device.

BACKGROUND

Currently, many applications exist that provide for a position and orientation of a user of a communication device. One such well known application is global positioning system (GPS) installed on the communication device. GPS provides a real-time position tracking of the user of the communication device. When a user sends a message to a recipient using the communication device, information about the user's position and orientation may be automatically retrieved based on the GPS data or similar applications such as Galileo (global navigation satellite system) and European geostationary navigation overlay service (EGNOS) existing on the communication device. However, this position is a static position of the user based on a location at the time the message was sent, and does not give any information on a current position and orientation of the user when the recipient reads the message.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide a mechanism for providing a specification of a location of a user of a communication device. According to one embodiment of the disclosure, a method for providing the specification of the location of the communication device user includes receiving a first position data of a communication device. The first position data is a location of a user of the communication device at a first time when the user either begins to compose a message on the communication device or initiates an application to compose the message on the communication device. The method also includes receiving second position data of the communication device. The second position data is the location of the user at a second time when the user sends the message to a recipient via the communication device. The method also includes generating a velocity vector based on the first position data, the second position data, the first time and the second time. The method further includes sending, the velocity vector along with the message to the recipient.

In some embodiments, the velocity vector is received by the recipient at the communication device. The communication device of the recipient is different from the communication device of the user. In some embodiments, the velocity vector can be used by the receiving device to ascertain updated location of the user. In one embodiment, future direction of the user is predicted based on the velocity vector. In another embodiment, the direction in the velocity vector is used to predict which direction the user may be headed without any direct interaction with the user. As such, the user doesn't need to provide or enter any data regarding the direction in which he/she may be headed. In other embodiments, speed, predicted mode of transportation and predicted future direction of the user may be determined based on the velocity vector without the direct interaction with the user. As such, the user doesn't need to provide or enter any data regarding the speed, mode of transportation and future direction of the user.

Embodiments of the disclosure also provide a location specification processing module initialized on a computer system. In one embodiment, the location specification processing module receives the position data and the time data associated with a message provided by a user of the communication device in real-time. The location specification processing module generates a velocity vector based on the position data and the time data and sends the velocity vector along with the message to a recipient of the message.

Figure 1:
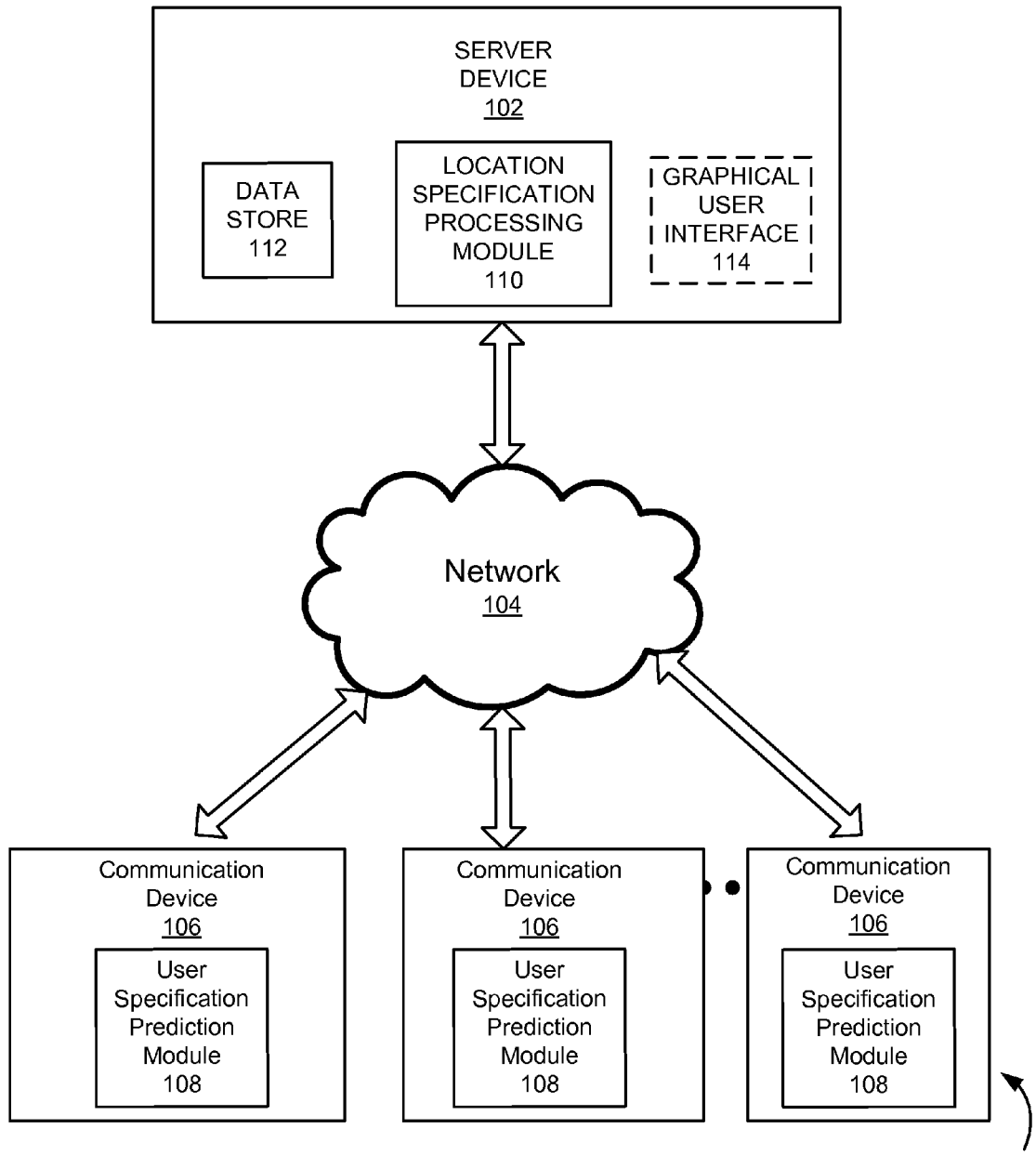
FIG. 1 is a block diagram of a computer system in which the embodiments of the disclosure may operate.

FIG. 1 illustrates an example of a network architecture 100 in which embodiments of the disclosure may operate. The network architecture 100 may include communication (a.k.a. client) devices 106, a server device (server) 102 and a network 104. The communication devices 106 may be any of a variety of different computing devices such as, for example, smart phones, mobile phones, tablet device, personal digital assistants (PDAs), portable computers, desktop computers, personal computers (PCs), server computers, palm-sized computing devices, etc. The communication devices 106 are communicably coupled to the server 102 via the network 104. Network 104 may be a public network (e.g., Internet) or a private network (e.g., Ethernet or a local area Network (LAN)).

In one embodiment, the server device 102 can be any type of computing device including a laptop computer, a handheld computer, a netbook, a desktop, a workstation or similar computing device. The system can include any number of server devices 102 that communicate over a network 104 with any number of communication devices 106. A single server device 102 is illustrated and described for sake of clarity.

The server device 102 may host a location specification processing module 110, a data store 112 and a graphical user interface (GUI) 114. The location specification processing module 110 functions to provide for specification of a location of the user of the communication device. Users of the communication devices 106 may interact with server 102 by exchanging messages via standard protocols, such as, File Transfer Protocol (FTP) and Hypertext Transfer Protocol (HTTP), to name some examples. Each communication device 106 runs communication applications to compose and send messages that are received by the location specification processing module 110 deployed on the server 102.

A message may be any type of communication received by the server 102. Some examples of messages include, but are not limited to, an e-mail, instant message (IM), short message service (sms), voice, mobile web, and so on.

In some embodiments, each communication device 106 runs communication applications to generate a position data, P and time data, T associated with the message generated by a user of the communication device, which is processed by the location processing module 110. In some embodiments, the position data and the time data is computed using a global positioning system (GPS) application installed on the communication device 106. Some other applications include, but are not limited to, Galileo (global navigation satellite system) and European geostationary navigation overlay service (EGNOS). In some embodiments, the P is the first location and the T is the first time when a user begins to either compose a message or initiate an application to compose the message on the communication device 106. In other embodiments, the P is the second location and the T is the second time when the user sends the message to a recipient of the communication device 106. The communication device 106 of the recipient is different from the communication device 106 of the user.

In some embodiments, the server device 102 receives the P and the T associated with the message from the communication device 106. In one embodiment, the P and the T associated with the message is received in real-time. In one embodiment, the real-time occurs at an instant in which the server device 102 receives the message from the communication device 106. In some embodiments, the location specification processing module 110 generates velocity vector based on the P and the T and the server device 102 sends the velocity vector along with the message to the recipient. As discussed above, a message is any type of communication composed and sent by the communication device 106 and received by the computer system. Some examples of the messages may include, but is not limited to, an e-mail, instant messaging (IM), short message service (sms), voice, mobile web etc.

In embodiments of the disclosure, the location specification processing module 110 generates a velocity vector based on the P and the T data. Velocity is a vector quantity that refers to the rate at which an object changes its position. As such, velocity, V, is determined as follows:

$$V = \frac{P1 - P2}{T1 - T2}$$

In one embodiment, the P includes a first position, P1, and the T includes a first time, T1, associated with the location and time that the user begins to compose a message or starts an application for composing a message in the communication device. In another embodiment, the P also includes a second position, P2, and the T includes a second time, T2, when the user sends the message via the communication device. In some embodiments, velocity vector along with the message is stored in the data store 112. In other embodiments, the server device 102 sends the velocity vector along with the message to the recipient. In other embodiments, the velocity vector may be displayed using the GUI 114. In one embodiment, the velocity vector is displayed as a graphical representation.

In one embodiment each communication device 106 includes a user specification prediction module 108 that may compute data based on the velocity vector received from the server device 102. In some embodiments, the data includes but not limited to speed of the user, predicted mode of transportation of the user and predicted future direction of the user. Each communication device 106 may also include a graphic user interface (GUI) for viewing the velocity vector provided by the server 102.

Figure 2:
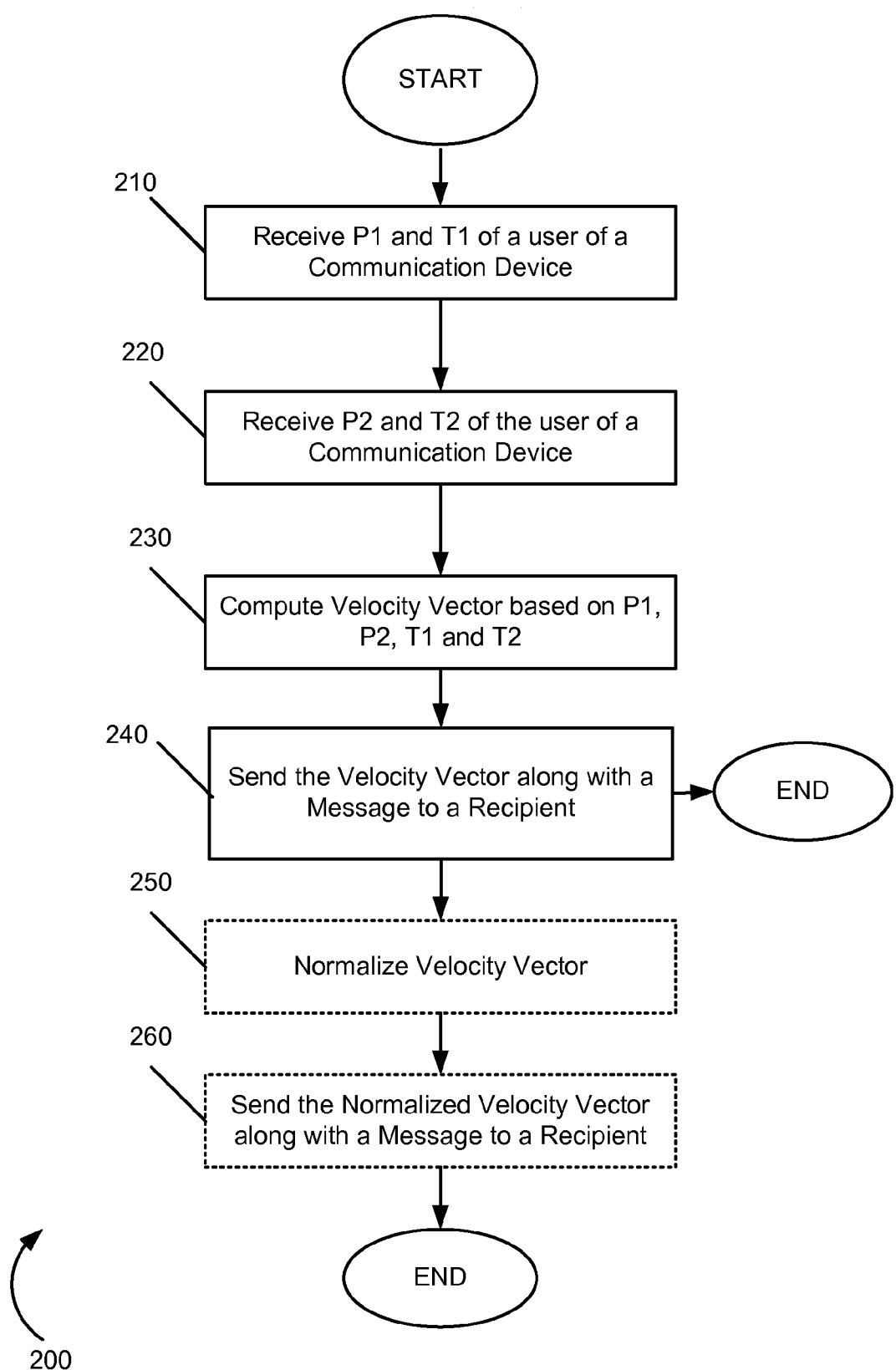
FIG. 2 is a flow diagram of one embodiment of a server-side method for providing specification of a location of a user of a communication device.

FIG. 2 is a flow diagram illustrating a method 200 for providing specification of a location of a user of a communication device according to an embodiment of the disclosure. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by the location specification processing module 110 of the server device 102 of FIG. 1.

Method 200 begins at block 210 where a first position, P1, and a first time T1, of a user of the communication device is received by the server device 102. As discussed above, in one embodiment, P1 is a position and T1 is a time when the user begins to compose a message or starts an application for composing a message. In some embodiments, the P1 and T1 may be computed using a global positioning system (GPS) application installed on the communication device 106. In other embodiments, the P1 and the T1 may be computed using other applications including, but not limited to, Galileo (global navigation satellite system) and European geostationary navigation overlay service (EGNOS) installed on the communication device 106. At block 220, a second position, P2, and a second time, T2, of a user of the communication device is received by the server device 102. As discussed above, in one embodiment, P2 is the position and T2 is the time when the user sends the message to a recipient. In some embodiments, the P2 and the T2 may be computed using a GPS application installed on the communication device 106. In other embodiments, the P2 and the T2 may be computed using other applications including, but not limited to, Galileo (global navigation satellite system) and European geostationary navigation overlay service (EGNOS) installed on the communication device 106.

At block 230, a velocity vector is computed by the Location Specification Processing Module 110 of the server device 102. In one embodiment, the velocity vector is computed based on the two coordinates, position coordinates, P1 and P2, and time coordinates, T1 and T2. The velocity vector describes the rate at which the user changes his or her position and the direction of the user.

Figure 3:
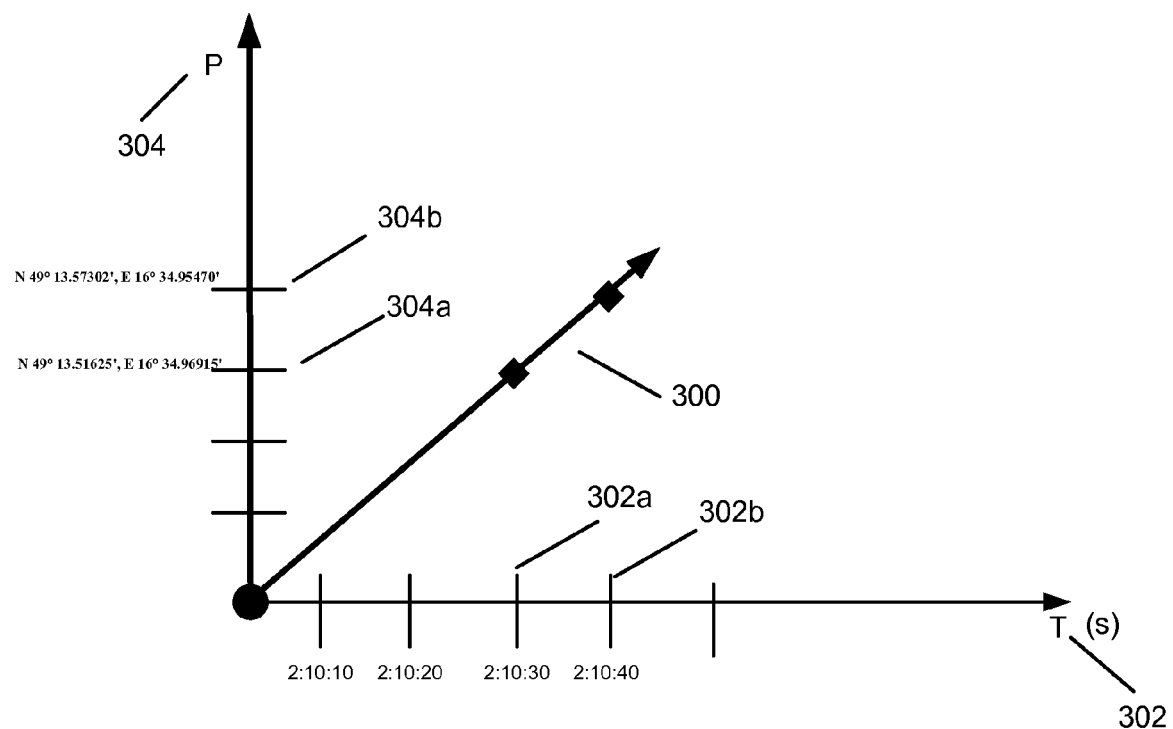
FIG. 3 illustrates a graphical representation of a velocity vector computed according to an embodiment of the disclosure.

In one embodiment, a graphical representation of a velocity vector 300 is illustrated in FIG. 3. Graphically, a velocity vector is represented by an arrow defining the direction. In addition, the length of the arrow defines the vectors' magnitude. The head of the vector shows the direction of the user of the communication device and the tail illustrates the starting position of the communication device. As shown in FIG. 3, the x axis represents the time data T 302 measured in hours, minutes and seconds and y axis represents the position data, P 304 measured in latitude and longitude positions. In the example shown in FIG. 3, T1 302a is measured at time 2:10:30, with 2 being the hour, 10 being the minutes and 30 being the seconds. Also, in the example, T2 302b is measured at time 2:10:40, with 2 being the hour, 10 being the minutes and 40 being the seconds. As such, in the illustrated example, the time difference between T1 and T2 is 10 seconds.

Also, in the example, P1 304a is measured as N 49° 13.51625', E 16° 34.96915' with N 49° 13.51625' being the latitude position and E 16° 34.96915' being the longitude position; and P2, 304*b* is measured as N 49° 13.57302', E 16° 34.95470' with N 49° 13.57302' being the latitude position and E 16° 34.95470' being the latitude position. The direction of the arrow in the example of FIG. 3 indicates that the user is headed northeast.

Referring back to FIG. 2, at block 240, the velocity vector along with the message is sent to the recipient by the server device 102. In one embodiment, the recipient uses the communication device 106 (different from the communication device of the user) to receive and send messages. In alternate embodiment, at block 250, the velocity vector is normalized by the Location Specification Processing Module 210 of the server device 102. In one embodiment, the velocity vector is normalized by retrieving most recent data of the velocity vector. For example, the velocity vector is normalized by retrieving the rate at which the user changes his or her position and the direction of the user in last three seconds. At block 260, the normalized vector along with the message is sent to the recipient by the server device 102.

Figure 4:
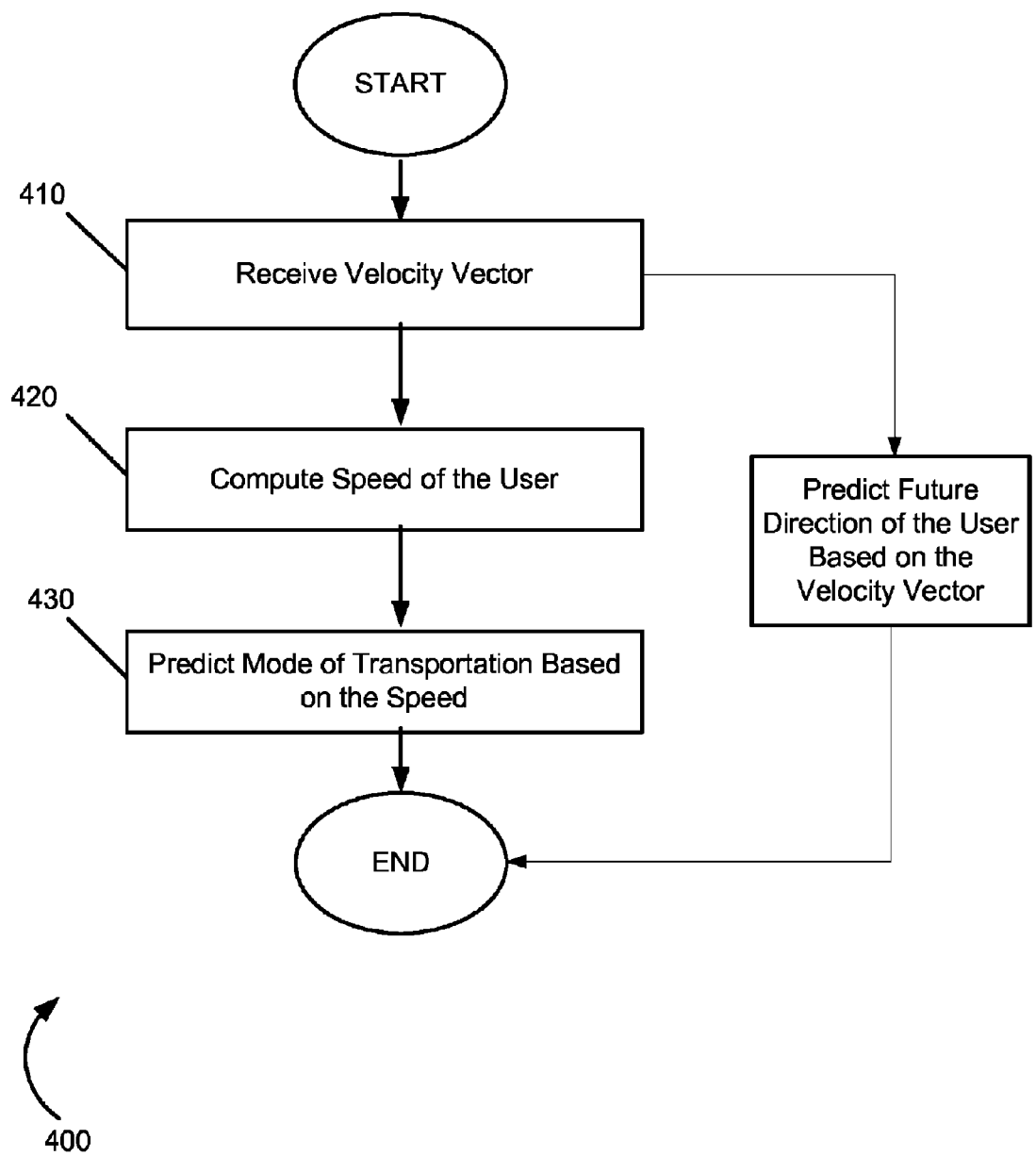
FIG. 4 is a flow diagram of one embodiment of a client-side method for providing specification of a location of a user of a communication device.

FIG. 4 is a flow diagram of a client-side method 400 for providing specification of a location of a user of a communication device according to an embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the user specification prediction module 108 of the communication device 106 of FIG. 1.

At block 410, the velocity vector is received by the recipient of the communication device 106 (different from the communication device 106 of the user). At block 420, a speed of the user is computed by the user specification prediction module 108 based on the velocity vector. For example, the speed may be computed based on distance traveled between P1 and P2 divided by time of travel between T1 and T2. In some embodiments, the speed may be zero indicating that the user is in a static position. At block 430, a mode of transportation of the user is predicted by the user specification prediction module 108 based on the speed of the user. The mode of transportation may include, but not limited to, bus, car, train, bike, walk etc. For example, a slow speed may indicate that the user is walking, a medium speed may indicate that the user is biking and a high speed may indicate that the user is traveling by one of train, bus or car. In one embodiment, the mode of transportation of the user is determined without any direct interaction with the user. At block 440, a future direction of the user is predicted by the user specification prediction module 108 based on the velocity vector. In one embodiment, the direction in the velocity vector is used to predict which direction the user may be headed without any direct interaction with the user.

Figure 5:
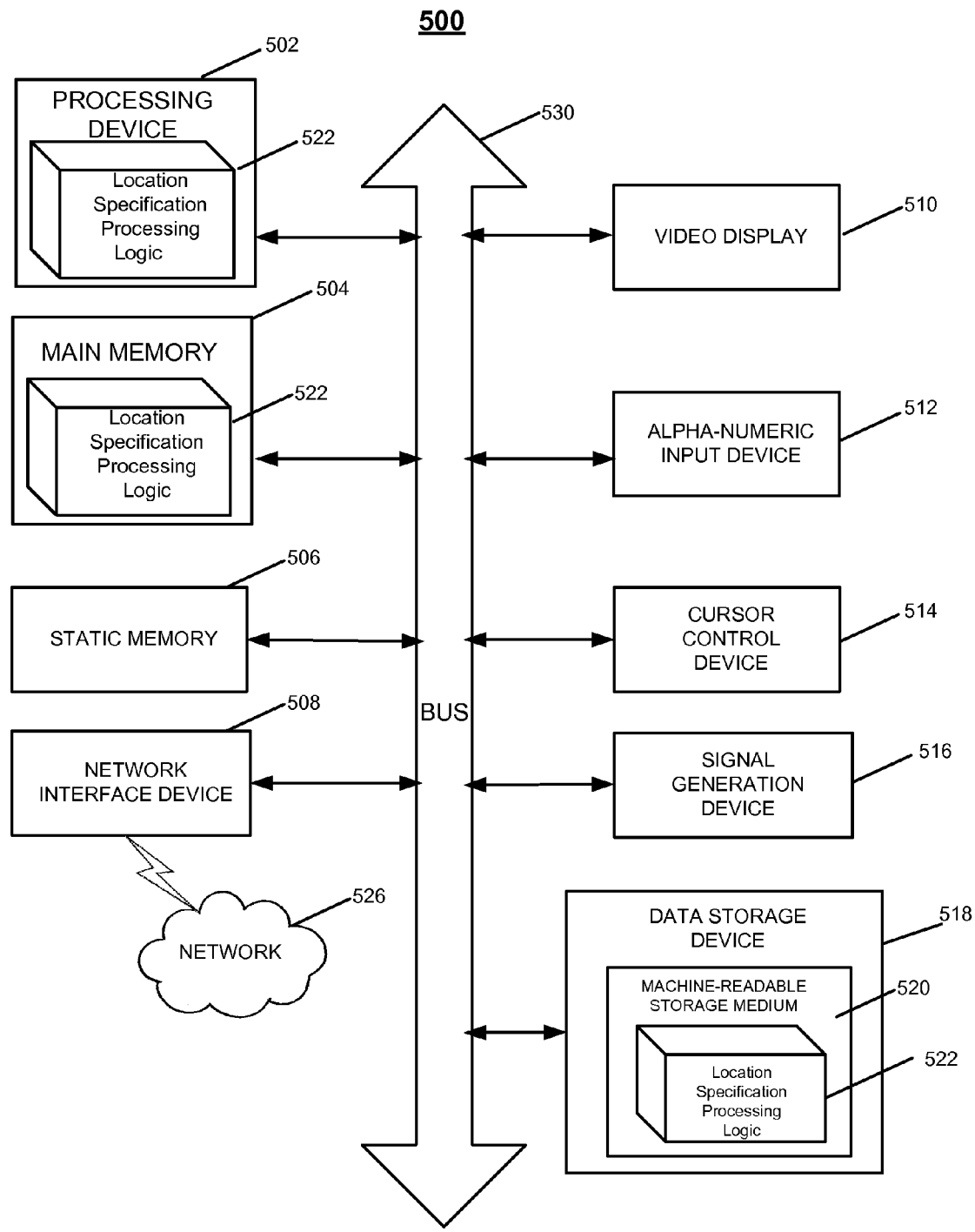
FIG. 5 illustrates a block diagram of one embodiment of a computer system.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute location specification processing logic 522 for performing the operations and steps discussed herein. In one embodiment, location specification processing module 112 described with respect to FIG. 1 performs the location specification processing logic 522.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium (or more specifically a computer-readable storage medium) 520 on which is stored one or more sets of instructions (e.g. location specification processing module logic 522) embodying any one or more of the methodologies of functions described herein, such as method 200 for providing specification of a location of a user of a communication device described with respect to FIG. 1. The location specification processing module logic 522 may also reside, completely or at least partially, within the memory 506 and/or within the processing device 502 during execution thereof by the computer system 500; the memory 506 and the processing device 502 also constituting machine-accessible storage media.

The machine-readable storage medium 520 may also be used to store the location specification processing module logic 522 persistently containing methods that call the above applications. While the machine-readable storage medium 520 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It should be apparent, however, that the disclosure may be practiced without these specific details. In some instances, structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those well-known in the data processing arts to most effectively convey the substance of their work to others well-known in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "receiving", "sending", "generating", "storing", "predicting" "determining" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other embodiments will be apparent to those well-known in the art upon reading and understanding the above description. Although the disclosure has been described with reference to specific examples of embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method, comprising:
   in response to receiving first data indicative of initiation of at least one of composing a message associated with an application or initiating the application to compose the message on a communication device, generating, by a processing device, a first position data of the communication device, wherein the first position data is a first location of the communication device at a first time;
   in response to receiving second data indicative of the message associated with the application being requested to be sent to a client device via the communication device, generating, by the processing device, a second position data of the communication device, wherein the second position data is a second location of the communication device at a second time;
   generating, by the processing device, a velocity vector in view of the first position data, the second position data, the first time and the second time;
   normalizing the velocity vector in accordance with a rate at which the communication device changes at least one of position or direction in a determined time period; and
   sending, by the processing device, the normalized velocity vector along with the message associated with the application to the client device.

2. The method of claim 1, wherein the determined time period of the normalized velocity vector is a most recent time period.

3. The method of claim 1 wherein the first position data and the first time is received at a time of receipt of the message at the client device.

4. The method of claim 1 wherein the second position data and the second time is received in at a time of receipt of the message at the client device.

5. The method of claim 1, wherein the normalized velocity vector is utilized to predict a mode of transportation of the communication device.

6. A method, comprising:
   receiving, at a client device, a velocity vector with a message from a communication device, wherein the message is associated with an application on the communication device such that the velocity vector comprises a first position data of the communication device and a second position data of the communication device, wherein the first position data comprises a first location of the communication device at a first time corresponding to a receipt of a first data indicative of initiation of one of compose the message associated with the application or initiate the application to compose the message on the communication device, and the second position data comprises a second location of the communication device at a second time corresponding to a receipt of a second data indicative of the message associated with the application is sent from the communication device to the client device; and computing, by a processing device, a speed of motion of the communication device in view of the velocity vector with the message associated with an application;

wherein the velocity vector is normalized in accordance with a rate at which the communication device changes at least one of position or direction in a determined time period.

7. The method of claim 6 further comprising predicting future direction of the communication device in view of the velocity vector.

8. The method of claim 7 wherein the future direction of the communication device is predicted without any direct interaction with a user of the communication device.

9. The method of claim 6 further comprising predicting mode of transportation of the communication device in view of the speed.

10. The method of claim 9 wherein the mode of the transportation of the communication device is predicted without any direct interaction with a user of the communication device.

11. A system comprising:
a memory; and
a processing device, operatively coupled to the memory, to:
  in response to receiving first data indicative of initiation of at least one of composing a message associated with an application or initiating the application to compose the message on a communication device, generate a first position data of the communication device, wherein the first position data is a first location of the communication device at a first time;
  in response to receiving second data indicative of the message associated with the application being requested to be sent to a client device via the communication device, generate a second position data of the communication device, wherein the second position data is a second location of the communication device at a second time;
  generate a velocity vector in view of the first position data, the second position data, the first time, and the second time;
  normalize the velocity vector in accordance with a rate at which the communication device changes at least one of position or direction in a determined time period; and
  send the normalized velocity vector along with the message associated with the application to the client device.

12. The system of claim 11, wherein the normalized velocity vector is utilized to predict a mode of transportation of the communication device.

13. The system of claim 11, wherein the determined time period of the normalized velocity vector is a most recent time period.

14. The system of claim 11 wherein the first position data and the first time is received at a time of receipt of the message at the client device.

15. The system of claim 11 wherein the second position data and the second time is received in at a time of receipt of the message at the client device.

16. A non-transitory machine-readable storage medium including data that, when accessed by a processing device, cause the processing device to:
  in response to receiving first data indicative of initiation of at least one of composing a message associated with an application or initiating the application to compose the message on a communication device, generate, by the processing device, a first position data of the communication device, wherein the first position data is a first location of the communication device at a first time;
  in response to receiving second data indicative of the message associated with the application being requested to be sent to a client device via the communication device, generate, by the processing device, a second position data of the communication device, wherein the second position data is a second location of the communication device at a second time;
  generate, by the processing device, a velocity vector in view of the first position data, the second position data, the first time, and the second time;
  normalize the velocity vector in accordance with a rate at which the communication device changes at least one of position or direction in a determined time period; and
  send, by the processing device, the normalized velocity vector along with the message associated with the application to the client device.

17. The non-transitory machine-readable storage medium of claim 16, wherein the determined time period of the normalized velocity vector is a most recent time period.

18. The non-transitory machine-readable storage medium of claim 16 wherein the first position data and the first time is received at a time of receipt of the message at the client device.

19. The non-transitory machine-readable storage medium of claim 16 wherein the second position data and the second time is received at a time of receipt of the message at the client device.

20. The non-transitory machine-readable storage medium of claim 16, wherein the normalized velocity vector is utilized to predict a mode of transportation of the communication device.

* * * * *